United States Patent [19]

Moore

[11] Patent Number: 6,080,221

[45] Date of Patent: Jun. 27, 2000

[54] VACUUM COATED PARTICULATE FERTILIZERS

[75] Inventor: William P. Moore, Hopewell, Va.

[73] Assignee: Agri-Nutrients Technology Group, Inc., Disputanta, Va.

[21] Appl. No.: 09/398,515

[22] Filed: Sep. 17, 1999

[51] Int. Cl.$^7$ ................................ C05G 3/02; C05G 5/00
[52] U.S. Cl. ..................... 71/11; 71/18; 71/27; 71/28; 71/31; 71/33; 71/34; 71/63; 71/64.07
[58] Field of Search ................ 71/64.07, 11, 18, 71/27, 28, 31, 33, 34, 63

[56] References Cited

U.S. PATENT DOCUMENTS

| | | | |
|---|---|---|---|
| 3,903,333 | 9/1975 | Shirley, Jr. et al. | 71/64.07 |
| 4,150,965 | 4/1979 | Van Hijfte et al. | 71/64.07 |
| 4,804,403 | 2/1989 | Moore | 71/28 |
| 5,399,186 | 3/1995 | Derrah et al. | 71/64.07 |
| 5,547,486 | 8/1996 | Detrick et al. | 71/64.07 |
| 5,766,302 | 6/1998 | Lefroy et al. | 71/64.07 |
| 5,851,261 | 12/1998 | Markusch et al. | 71/64.07 |
| 5,984,994 | 11/1999 | Hudson | 71/64.07 |

*Primary Examiner*—Wayne Langel

[57] ABSTRACT

A method of coating fertilizer particles exhibiting porous surfaces under vacuum to form attrition resistant controlled release particulate fertilizers, by drawing a vacuum on the fertilizer particles and applying thereto a water insoluble fluid resin at about atmospheric pressure, so that the fluid resin is forced into the porous surfaces of the fertilizer particles by differences in pressure, and then hardening the fluid resin to form a solid resin, tenaciously bonded onto, and into, the porous surfaces of the fertilizer particles. Porous surfaced water soluble, slow releasing and sulfur coated, fertilizers may be effectively coated. Granular, briquetted, compacted and other special shaped fertilizers may also be effectively vacuum coated to provide controlled release products. Pesticides may also be effectively included in these attrition resistant products. Fertilizers are provided which exhibit substantially improved resistance to attrition.

24 Claims, No Drawings

VACUUM COATED PARTICULATE FERTILIZERS

FIELD OF INVENTION

This invention relates to the field of plant nutrients, and more particularly to, particulate fertilizers coated with attrition resistant tenacious resin. The new fertilizer composition provides stronger, less frangible, coatings and thereby more reliable release of plant nutrients and pesticides than previously disclosed compositions. The new fertilizer particles contain small amounts of solid, water insoluble coating material, applied as a fluid, evenly coating fissures, cavities, cracks, crevices, holes, and all types of smooth and irregular shapes, called porous surfaces herein, on the fertilizer particles. In the new composition, the water insoluble coating materials are forced into, and onto, the fertilizer particle surfaces by pressure differences between the fertilizer particle subsurface, and the applied liquid coating material.

The new composition may be conveniently prepared by placing particulate plant nutrients under a vacuum sufficient to create a low subsurface pressure in the particles; covering the particles with water insoluble resin at about atmospheric pressure, so that the lower subsurface pressure draws the fluid into, and onto, the porous surfaces of the particles; and, then, hardening the water insoluble coating resins by conventional means.

DESCRIPTION OF PRIOR ART

Rapid release of water soluble plant nutrients in soils containing plants may cause phytotoxicity to the plants, and/or the early depletion of the plant nutrient by leaching. Researchers for a long time have attempted to develop plant nutrient particles which release nutrients at about the same rate of their uptake by plants. Improved release control has been achieved by chemically modifying nutrients to form low solubility nutrients, such as ureaformaldehyde polymers, and by physically coating soluble nutrient granules with various low solubility materials, such as sulfur, paraffin wax, and plastics.

Most plant food nutrient particles used as fertilizers are not smooth surfaced spheroids. These particles usually contain substantial areas of porous surfaces, which comprise cavities, fissures, cracks, crevices, pores, holes, indentations, pits, interstices between small agglomerated particles, and smooth surfaces containing holes which penetrate to subsurface areas. All of these surface imperfections may be summarized by the term "porous surfaces." Porous surfaces usually cover more than fifteen percent of the apparent area of fertilizer particles. The actual surface area of the particles, counting the porous and subsurface areas, are usually much higher than the apparent area of smooth surfaced spheroids of equal diameters.

Until now, the porous surfaces of fertilizer particles have posed a problem in obtaining strong, attrition resistant, coatings, when coated controlled release fertilizers were made. The porous surfaces may be bridged when particles are coated with sulfur, or resins, by conventional means, such as spraying, or rolling at atmospheric pressure. When the coatings do not penetrate into the porous surfaces, the bonds between the coating material and the surface of the particle are weak, and the coated fertilizers are subject to serious attrition during shipping, handling, and applications. Many of the current coated fertilizers exhibit unpredictable nutrient release patterns because of weaknesses in the coatings bridging over porous surfaces on the coated plant nutrient particles. Likewise pesticides coated onto fertilizer particles are subject to unreliable release rates and tend to break off of the fertilizer causing inaccurate application as well as hazards during handling.

Commercial fertilizer granules are formed by aggregation of small particles of the fertilizer material, leaving many small cavities and interstices in the granule's porous surfaces. Some of the familiar products of this type are granulated urea, diammonium phosphate, monoammonium phosphate and potassium chloride. Many materials, such as prilled urea or ammonium nitrate form surface irregularities commonly called "dimples" when they shrink while solidifying in the prilling process, creating a porous surface.

Plastic coatings are usually applied to fertilizer particles as liquid resins, emulsions, or dispersions. The viscosities of these liquids are high enough that without a pressure driving force the liquids do not flow evenly over, and penetrate, the porous surfaces of the fertilizer particles. These liquids either bridge over the surface irregularities leaving thinly covered void space below, or leave the irregularities uncovered. When sulfur is used as the coating materials, coating is even less effective, because sulfur is viscous as a liquid, and is quickly solidified when it comes in contact with the fertilizer particles. Further application of sulfur, even on smooth surfaces, creates a new porous surface which tends to crack as it is stored or handled.

Fertilizer particles, such as urea and ammonium salts are polar materials which tend to inhibit absorption-adsorption of non-polar coatings, such as sulfur, plastics or resins. A driving force is needed to overcome the resistance of these materials to bond with each other.

The use of low viscosity monomers does allow better penetration of the monomers into the porous surfaces of the granules than with the more viscous materials such as sulfur and polymers, but still does not achieve the desired penetration and coverage. The monomers react with the fertilizer particles to form solid materials which block further flow of the monomers into the narrowed cavities of the porous surfaces. The monomers also require careful handling because of their toxicity.

Large particles of fertilizers such as briquettes and pellets are used in special plant feeding operations such as aquaculture or tree fertilization. These particles, sometimes more than one centimeter in diameter and thickness, are usually formed by briquetting, or granulating, smaller particles. These large particles contain very large numbers of surface cavities resulting from interstices between the small particles used. These cavities weaken any normal coating placed on the surface.

Blouin in U.S. Pat. No. 3,342,577 disclosed a sulfur coating process, using an oil based sealer, and a diatomaceous earth conditioner to produce controlled release plant food granules. Hansen in U.S. Pat. Nos. 3,259,482 and 3,264,089 taught the preparation of slow release fertilizers by coating soluble granules with expoxidized soybean oil with a polyester curing agent and with polyurethane polymers.

Moore in U.S. Pat. Nos. 4,711,659, 4,781,749, and 4,804,403 taught the reaction of low viscosity monomers with soluble fertilizer granules and with other monomers to form water insoluble coatings chemically connected with, and sealed to, the soluble fertilizer granules.

Goertz et al in U.S. Pat. No. 5,219,465 extended the residual, controlled release, of sulfur coated fertilizer products by applying polymeric topcoats as a sealant over fresh sulfur coatings. Detrick in U.S. Pat. No. 5,599,374 disclosed a sulfur-coated urea slow release granular fertilizer having a durable polymeric coating over the sulfur coating. The polymer coating was formed by the direct in-situ copolymerization of diethylene glycol-triethanolamine polyol and a diisocyanate on the surface of the sulfur coated urea granule.

In summary, the fertilizers of the prior art have improved the release of plant nutrients from fertilizer particles, but they still have the serious defects of excess frangibility of the coatings caused by the bridging of porous surfaces, and failure to form strong, continuous, bonds with the complete particle surfaces. The use of the prior art methods require care to prevent bubbles in the coating material and use of low shear handling of the coating materials. The prior art methods are not well suited to coating sulfur coated fertilizers which contain frangible, porous surfaces, and the prior art offers no effective method of drawing biologically active additives into the surfaces of fertilizer granules.

SUMMARY OF THE INVENTION

I have now discovered that plant nutrient particles exhibiting porous surfaces may be coated with tenacious resins to form attrition resistant fertilizers by subjecting the particles to lower than one atmosphere pressure and then applying a water insoluble fluid resin, at about one atmosphere pressure onto the particles. The pressure difference between the particles and the porous surfaces of the particles forces the liquid resin into the cracks, cavities, fissures, crevices, interstices, holes, and all types of irregular shapes of the particle surfaces. It is surprising that the fluid resin retains its higher pressure long enough to force it into the porous surfaces of the granules maintained at a lower pressure. The fluid resin is also forced into the particle subsurfaces through small holes even on smooth surfaces. Conventional resin curing techniques may be used to convert the water insoluble fluid resins to solid tenacious resin strongly bonded to the surface of the plant nutrient particles. Controlled release fertilizer particles which are resistant to attrition from handling, shipping and application are provided.

In a variation of the vacuum coating method biologically active materials may be applied to the porous surfaces of plant nutrient particles so that they are resistant to attrition thereby significantly reducing the hazard in the use of these biologically active materials which could produce hazardous dusts.

The new coated plant nutrient particles of this invention provide reliably strong and attrition resistant plant nutrient and biologically active materials in a controlled manner.

The pressures expressed herein are provided in atmospheres absolute unless otherwise specifically indicated.

DETAILED DESCRIPTION OF THE INVENTION

The instant invention provides a method of coating plant nutrient particles, exhibiting porous surfaces, with tenacious resin to form attrition resistant particulate fertilizers. In the instant method, plant nutrient particles which exhibit porous surfaces are placed in a coating vessel equipped for operation at less than one atmosphere pressure. The pressure is reduced in the coating vessel to less than one atmosphere, and water insoluble fluid resin at a pressure of about one atmosphere is applied to the surfaces of the plant nutrient particles so that the fluid resin is forced into the porous surfaces of the particles by a difference in pressure between the porous surface of the particles and the fluid resin. The fluid resin is converted to solid tenacious resin bonded into the porous surfaces of the plant nutrient particles by curing the resin.

Most of the commercially available particulate water soluble fertilizer materials exhibit porous surfaces which are suitable for coating using the instant method. These materials include urea, ammonium sulfate, ammonium phosphate, potassium chloride, potassium nitrate, and potassium nitrate.

The method is also effective when the plant nutrient particles exhibiting porous surfaces are slow releasing fertilizers. Materials which are coated effectively, include, ureaform, magnesium ammonium phosphate, magnesium potassium phosphate, isobutylidene diurea, oxamide, granulated poultry waste, and aminoureaformaldehyde polymers.

Some of the water insoluble fertilizers exhibiting porous surfaces which are suitable for coating using the instant method are water soluble fertilizer particles coated with water insoluble inorganic materials including sulfur, magnesium ammonium phosphate, magnesium potassium phosphate, calcium phosphate, magnesium phosphate, and zinc phosphate. These coating materials are insoluble enough to protect the soluble nutrients which they coat but usually have poor physical integrity and thus are subject to serious attrition and loss of efficacy when they are handled and in many cases during storage. They therefore need a resin coating to provide the attrition resistance necessary for effective commercial use. Sulfur coated urea is a large scale product which exhibits a very rough and porous surface which needs treatment to reduce its very high attrition rate and which may be effectively coated by the instant method.

Most plant food particles exhibit very porous surfaces in which the total surface areas are many times larger than the apparent area calculated from the particle's external measurements. Granules, briquettes, compacted pieces, tablets, extrusions, and pellets are all formed as practical and useful fertilizer particles by agglomeration of many small particles by various means. These agglomerates contain very porous surfaces and large subsurface areas and interstices. When these particles are coated by methods of the prior art, many parts of the particles are not bonded to the coating and attrition during handling, shipping and applying is a serious problem, causing loss of reliability in nutrient release control. When the foregoing agglomerated fertilizer particles are coated by the instant method, good attrition resistance is achieved with retention of controlled release of the plant nutrients.

Some porous surface on the granules is required for the liquid to penetrate into, so that a completely smooth spheroid with no surface irregularities would not be effective in the instant method. The amount of porous surface on a particle may be readily determined, for example, by photographing the particle surface and measuring the porous areas.

Prills produced by solidifying melts, such as sodium nitrate or potassium nitrate, usually contain holes or irregularities called dimples which amount to about 10 percent of the area of the particles. These prills may be effectively coated by the instant method. Other fertilizer particles, for example, diammonium phosphate, or urea granules exhibit surfaces that are almost completely porous, containing little or no smooth surfaces for bonding with coatings, without large number of places where the coating is not bonded with the granule surface.

The instant method may be carried out in a variety of vessels so long as the vessel is equipped for operation at pressures less than one atmosphere. An effective vessel found comprises a closed tank which rotates around its horizontal axis, causing plant nutrient particles contained therein to roll and thereby expose the porous surfaces of the particles for coating.

The reduced pressure, or vacuum, maintained in the coating vessel and therefore in the porous surfaces of the particles is important. This pressure must be lower than the pressure of the fluid resin coating applied. The instant method is effective when the pressure in the coating vessel and the plant nutrient particles therein is reduced to between 0.06 and 0.40 atmospheres. To allow the fluid resin to be adequately forced into the porous surfaces, a period of time exceeding 30 seconds is required before the liquid resin is cured or the pressure is increased to about one atmosphere.

The instant method allows the use of a variety of water insoluble fluid resins. Resins forming effective coatings are listed as follows: polyurethanes, polyolefins, polyacrylate-butadiene-styrene, polyalkyds, polyesters, polyamides, and isocyanate-alkanolamine polymers.

The amount of the water insoluble fluid resin applied to the porous surfaces of the plant nutrient particles may be varied substantially between 0.5 and 20 percent of the attrition resistant particulate fertilizer on a dry basis, depending upon the condition of the surface of the plant nutrient particles, the rate of nutrient release desired, and economics. The application of less than 0.5 percent usually does not provide desired improvement in attrition resistance and more than 20 percent provides slower release of nutrients than is usually desired.

The surfaces of fertilizer particles vary widely in their porosity, shape, and size. The degree of control of release of plant nutrient desired also varies widely depending to a large extent upon the use the fertilizer is to be put to. These variations may be accommodated by this invention. To meet the need of varying rates of nutrient release, the instant method may be used wherein the water insoluble fluid resin is applied to the porous surfaces of the plant nutrient particles as a plurality of coating layers. As the number of layers is increased, the rate of nutrient release is decreased.

Water insoluble fluid resins to be effective in the instant method must be flowable. They may be viscous and need not be thin liquids, although thin liquids may be effectively used. The method is effective when the water insoluble fluid resin is a molten resin. A group of molten resins which are particularly effective includes polyurethanes, polyolefins, polacrylate-butadiene-styrenes, polyalkyds, polyesters, polyamides, and isocymanate-alkanolamine polymers.

The method may be effectively used where the water insoluble resin is applied to the porous surfaces of the plant nutrient particles by spraying at a pressure of between 0.7 and 3.5 atmospheres. This application technique is effective when the fluid resin is a thin liquid such as an aqueous emulsion. It is noted that systems of the prior art were unable to spray resin onto fertilizer particles because the technique left bubbles in the coatings. In the instant method, operating at pressures lower than atmospheric, bubbles in the coatings are not a problem as entrained air is forced out of the coatings before the coatings are hardened.

Because there is a pressure difference forcing the fluid resin into the porous surfaces of the plant nutrient particles in the instant method, the water insoluble fluid resin may be applied to the porous surfaces of the plant nutrient particles by pouring the resin onto the particles and spreading evenly thereover by rolling and rubbing actions of the particles in the coating vessel.

The formation of the final coated product must be completed by hardening the fluid resin. The instant method functions effectively where the resin hardening means for converting the fluid resin to solid tenacious resin coating is heating to a temperature above the boiling point of water. This treatment will evaporate water from any aqueous dispersions or emulsions used as fluid resins.

It was discovered that the products prepared by the instant method are unlike coated particles of the prior art and are attrition resistant particles exhibiting tenacious resin coatings penetrating into porous surfaces of the fertilizer particles.

Fertilizer granules are the most common form of commercially manufactured plant nutrient particles. A preferred method of preparing attrition resistant controlled release fertilizers consisting of granules, exhibiting porous surfaces, coated with tenacious resins, has been defined. In this method, fertilizer particles which exhibit porous surfaces amounting to more than 15 percent of the total surface of the particles are charged into a coating vessel comprising a tank rotating around its horizontal center axis, causing the contained fertilizer granules to roll and thereby expose the surfaces of the fertilizer granules for coating.

The pressure in the coating vessel and the porous surfaces of the fertilizer granules therein is reduced to between 0.06 and 0.40 atmosphere for a period of time between 30 and 300 seconds by means by a vacuum producing device, such as a vacuum pump, aspirator, or steam jet. The reduced pressure is maintained between 0.06 and 0.40 atmospheres and a water insoluble fluid resin which is an aqueous resin dispersion, amounting to between 2 and 15 percent of the fertilizer granules, containing between 15 and 40 percent resin, is applied at about 1 atmosphere pressure to the surfaces of the fertilizer granules, so that the fluid resin is forced into the porous surfaces of the fertilizer granules by differences in pressure between the porous surfaces and the fluid resin. This amount of resin coating is sufficient to provide controlled release of the fertilizer.

The fluid resin is converted to solid tenacious resin bonded onto, and into, the surfaces of the fertilizer granules, forming attrition resistant controlled release granular fertilizers, by heating to a temperature between 60 and 120° C. to dehydrate the aqueous resin dispersion.

The preferred method, described in the foregoing paragraphs, provides a new and improved product which comprises attrition resistant controlled release fertilizer granules, exhibiting porous surfaces coated with tenacious resins penetrating into the interstices between the agglomerated particles which form the granules.

As mentioned previously, the method of this invention is useful for converting sulfur coated fertilizer particles exhibiting poor resistance to attrition and erratic nutrient release properties into granules with good resistance to attrition, and reliable nutrient release patterns. The method best suited for preparing attrition resistant slow release fertilizers from particulate sulfur coated fertilizers contains four steps. In the first step particulate fertilizers, coated with between 8 and 25 percent sulfur and exhibiting diameters between 0.5 and 4.5 millimeters and porous surfaces amounting to more than 15 percent of the total surface of the particulate fertilizers at a temperature between 75 and 100° C., is charged into a coating vessel comprising a tank rotating around its center horizontal axis, causing the particulate fertilizers to roll and thereby expose the surfaces of the fertilizer particles for coating.

The pressure in the coating vessel and the porous surfaces of the particulate sulfur coated fertilizers therein is reduced to between 0.06 and 0.40 atmospheres for a period of time between 30 and 300 seconds.

The reduced pressure is maintained at between 0.06 and 0.40 atmospheres, and a molten water insoluble resin is applied at a temperature between 75 and 130° C. at a pressure of about 1 atmosphere, so that the molten resin is forced into, and onto, the porous surfaces by differences in pressure between the porous surfaces and the molten resin. The molten resin amounts to between 0.5 and 5.0 percent of the attrition resistant slow release fertilizer product. It is effective to use a variety of molten resins including polyolefins, ethylene vinyl acetate copolymer, polyurethane, grafted polyamide-polypropylene, and polyepoxy resins. In the fourth step the attrition resistant slow release fertilizers are cooled to a temperature lower than 50° C. to improve the storage properties of the granules.

The instant method of coating porous surfaces of fertilizer particles with tenacious resin may be effectively used as a method of coating porous surfaces of fertilizer particles with tenacious pesticide-resin solids to form attrition resistant fertilizer-pesticide combination particles. In this use of the method, fertilizer particles exhibiting porous surfaces amounting to more than 15 percent of the total surface of the particles are charged into a coating vessel which comprises a tank rotating around its horizontal center axis, causing the contained fertilizer particles to roll, and thereby, expose the surfaces of the fertilizer particles for coating. The pressure in the coating vessel and the porous surfaces of the fertilizer particles is reduced to between 0.06 and 0.75 atmosphere for a period of time between 30 and 600 seconds. The reduced pressure is maintained between 0.06 and 0.75 atmosphere, and a pesticide dispersed in a resinoid, containing between 5 and 60 percent pesticide, is applied at about one atmosphere pressure to the surfaces of the fertilizer particles so that the pesticide dispersed in the resinoid is forced into, and onto, the porous surfaces of the fertilizer particles by differences in pressure between the porous surface and the pesticide dispersed in the resinoid.

The pesticide dispersed in the resinoid is converted to a tenacious pesticide-resin solid bonded onto, and into, the porous surfaces of the fertilizer particles by heating at a temperature between 60 and 130° C. until the resinoid cures and forms a hardened resin providing attrition resistance for the pesticide and forming attrition resistant fertilizer-pesticide combination particles.

The term fluid resin, as used herein, means an organic polymeric liquid which, when converted to its final state, becomes solid. Examples include linseed oil, raw or heat bodied drying oils, emulsions, dispersions, molten plastics, monomers, and oligomers. Resinoids as used herein mean any thermosetting resin, either in its initial temporarily fusible state, or in its final infusible state. Heat bodied linseed oil, partially condensed phenol-formaldehyde and the like are considered resinoids. All the pressures herein provided in atmospheres mean atmospheres absolute so that one atmosphere pressure indicates normal atmospheric pressure.

Pesticides which may be effectively used in the instant method include insecticides, fungicides, acaricides and herbicides. The preferred pesticides for use in the instant method include the following commercially available pesticides: Pendimethalin, N-(1-ethylpropyl)-3,4-dimethyl-2,6-dinitrobenzenamine; Dursban, [0,0-diethyl-0-(3,5,6-trichloro-2-pyridyl)phosphorothioate]; Merit, 1-[(6-Chloro-3-pyridinyl)methyl]-N-nitro-2-imidazolidinimine; Aliette, Aluminum tris (0-ethyl phosphonate); Subdue, N-(2,6-dimethylphenyl)-N-(methoxyacetyl)alanine methyl ester; and Bayleton, 1-(4-chlorophenoxy)-3,3-dimethyl-1-(1H-1, 2,4-triazol-1-yl)-2-butanone.

The instant method provides a particulate attrition resistant combination fertilizer-pesticide composition which safely retains between 0.01 and 10 percent pesticide during handling and application.

MODE OF OPERATION OF THE INVENTION

Having described the basic concepts of the instant invention reference is now made to the following examples which are provided to illustrate the invention's method of coating plant nutrient particles, exhibiting porous surfaces, with tenacious resin to form attrition resistant particulate fertilizers.

EXAMPLE 1

This example demonstrates the vacuum coating method of preparing attrition resistant controlled release particulate fertilizers from water soluble urea granules.

To a stainless steel 8 cubic foot capacity Gemco batch type Double Cone vacuum dryer, jacketed for steam heating and water cooling, and equipped with a liquid spray bar running along the center of horizontal rotation of the dryer, was charged 175 pounds of urea granules, screened through a 4 mesh Tyler screen and onto a 8 mesh screen, at 90° C.

Rotation was started on the Double Cone at a rate of 20 rpm and a vacuum pump system connected to the Double Cone was actuated to reduce the pressure in the Double Cone and in the porous surfaces of the granules to 0.05 atmosphere. The pressure was maintained at that level for 100 seconds.

Daratak 3631, an aqueous emulsion of vinylidene chloride based polymer, containing about 10 percent each of acrylic acid and 2-ethylhexyl acrylate polymers, amounting to 3.5 pounds was introduced through the liquid spray bar of the Rotary Cone over a 2 minute period. The nozzles had been removed form the spray bar so that the emulsion merely was drawn in through ⅛" holes in the bar. The emulsion consisted of 47.8 percent polymer and 52.2 percent water and exhibited a Brookfield Viscosity at 20° C. of 45 centipoise.

Rotation was continued in the Rotary Cone to allow the fluid resin to coat onto and into the porous surface of the granules. The rotation was continued for 5 minutes at a temperature between 72 and 88° C. to allow emulsion to dry and cure.

The addition of the resin emulsion was repeated at 5 minute intervals with operating conditions maintained at the same level until a total of 5 additions were made so that a total of 8.4 pounds of resin was added on a dry basis, amounting to 4.5 percent of the final product.

The Double Cone then was brought to atmospheric pressure. The coated product was cooled to 40° C., and discharged. Total nitrogen analysis of the product was 43.8 percent and moisture content was less than 0.1 percent. The granules were free flowing without the addition of any clay conditioner.

EXAMPLE 2

This example demonstrates the attrition resistance of the vacuum coated fertilizer granules compared to conventionally coated fertilizer granules.

A sample of the product prepared in Example 1 was screened to pass through a 6 mesh screen and be retained on an 8 mesh Tyler screen. Two hundred grams of this screened material was placed in a one liter capacity ceramic ball mill. The ball mill was operated at 200 rpm for 15 minutes at ambient temperature and the contents were removed and screened to determine the amount of material passing through an 8 mesh Tyler screen, as a measure of the attrition. For comparison, a sample of urea coated with the same Daratak resin emulsion by conventional means at atmospheric pressure was given the same treatment. On completion of the ball mill treatments, the sample s were put through the standard 7-day dissolution tests devised by TVA. The average results of the tests run in duplicate are tabulated in the following table:

| Coating | | Fines Generated | % Urea Dissolved |
|---|---|---|---|
| Material | Method | In Ball Mill, % | In 7 Days |
| Daratak 3631 | Vacuum-Example 1 | 0.7 | 18 |
| Daratak 3631 | Atmospheric Press. Conventional Coating | 4.2 | 59 |

EXAMPLE 3

This example demonstrates the vacuum coating method of preparing attrition resistant slow release fertilizers from water soluble fertilizer particles coated with water insoluble inorganic materials, particularly sulfur.

In the Double Cone vacuum dryer used in Example 1 200 pounds of urea granules coated with 17 percent sulfur was charged at 84° C. after passing through a 4 mesh Tyler screen and being retained on an 8 mesh screen.

Rotation of the Double Cone at 20 rpm was started and the pressure in the Double Cone and the porous surfaces of the granules was reduced to 0.2 atmosphere and maintained at that level for 120 seconds.

Molten low density polyethylene blended to a melting point of 90° C., was charged in 10 equal doses at 135° C. to the mixture at 5 minute intervals until 4 pounds of molten resin had been added at atmospheric pressure to the granules tumbling in the rotating Double Cone operating at 0.2 atmosphere pressure. The Double Cone and its contents were cooled to 35° C. and pressure was brought to atmospheric. Product was discharged and analyzed with results, as follows:

| Component | Wt % |
|---|---|
| Nitrogen | 37.1 |
| Sulfur | 16.9 |
| Resin Coating | 2.1 |
| Moisture | Less than 0.1 |

EXAMPLE 4

This example demonstrates the improved efficacy of the vacuum coated fertilizers of the instant invention over that of conventionally coated fertilizers. The product of Example 3 and a sample of sulfur coated urea conventionally coated with an additional coating of 2 percent modified polyethylene were put through the ball mill attrition test and the 7-day dissolution test of Example 2. The results are tabulated in the following table.

| Coatings | | | Fines Generated | % Urea Dissolved |
|---|---|---|---|---|
| Sulfur | Plastic | Method | In Ball Mill, | In 7 Days |
| 17% | 2% blended PE | Vacuum-Example 3 | 1.2 | 20 |
| 17% | 2% blended PE | Atmospheric Press. Conventional Coating | 6.3 | 41 |

EXAMPLE 5

This example demonstrates a four step vacuum method of coating surfaces of fertilizer particles with tenacious pesticide-resin solids to form attrition resistant fertilizer-pesticide combination particles.

Granulated 19-2-19-2Fe-10(S) fertilizer particles were screened to provide −8+14 (Tyler screen) particles. The fertilizer comprised aminoureaformaldehyde, potassium sulfate, ammonium sulfate, and sodium phosphate. Microscopic examination of the surface of the granules showed that more than 50 percent of the surface could be classified as porous, as the granules contained large amounts of interstices between small particles, and large numbers of crevices, cracks, and holes. The fertilizer granules amounting to 200 pounds were charged in the double cone dryer of Example 1, at 80° C., in the first step.

In the second step, the pressure in the double cone dryer, and the porous surfaces of the fertilizer particles, was reduced to 0.10 atmosphere by means of a vacuum pump for 5 minutes.

The reduced pressure was maintained in the third step while N-(1-ethylpropyl)-3,4-dimethyl-2,6-dinitrobenzenamine dispersed in the resinoid, heat bodied linseed oil, was applied at 80° C. in 2 doses at a pressure of one atmosphere, amounting to 4 pounds total. The concentration of Pentamethylin in the heat bodied linseed oil was 5 percent.

The linseed oil containing the N-(1-ethylpropyl)-3,4-dimethyl-2,6-dinitrobenzenamine was converted in the fourth step to a tenacious pesticide-resin solid bonded onto and into the porous surfaces of the 19-2-19-2Fe fertilizer granules by heating for 20 minutes at 110° C. until the resinoid heat bodied linseed oil cured and formed a hardened resin providing attrition resistant Pentamethylin coated 19-2-19-2Fe granules. The product composition is tabulated as follows:

| Component | Wt % |
|---|---|
| Fertilizer 19-2-19-2Fe | 98.04 |
| Heat Bodied Linseed Oil | 1.86 |
| Pentamethylin | 0.10 |

EXAMPLE 6

This example demonstrates that attrition resistant particulate fertilizers exhibiting tenacious resin coatings penetrating into the porous surfaces of the fertilizer particles prepared by the instant method are new, qualitatively different compositions and provide improved performance over compositions of the prior art.

Product was prepared in the equipment and in the procedure of Example 1, except that the fluid resin used in the coating was an aqueous polyurethane dispersion containing 40 percent resin and 60 percent water, and the fertilizer particles were −6+8 mesh urea granules. The coating vessel was operated at a temperature of 82° C. and a pressure of 0.11 atmosphere. The polyurethane dispersion was added at atmospheric pressure at 91° C. in ten doses, until the total amount of polyurethane resin added amounted to 7 percent on a dry basis.

The product granules were recovered and ten granules were randomly selected. The granules were placed in fluid resin which was cured to clear plastic matrices, so that the granules could be carefully polished down to definite cross sections for viewing by electron microscopy. Inspection of the interfaces between the hardened resin coatings and the porous surfaces of the urea granules showed continuous bonding between the urea and the resin with no covered over holes or interstices. The resin coating was bonded into and onto the porous surfaces.

For comparison ten granules of a commercial granular fertilizer coated with 6 percent polyurethane applied by conventional spraying at atmospheric pressure were selected and mounted in clear plastic for electron microscopy. The photomicrographs showed frequent skips of the coating over porous portions of the granule surface, and thin "windows" of coating over holes and other types of uneven surfaces of the particle. The bonding between coating and fertilizer was not continuous, and the coating did not penetrate into the porous surfaces of the particles.

EXAMPLE 7

This example demonstrates the efficacy of the product of Example 3 which contained 37.1 percent nitrogen, 16.9 percent sulfur and 2.1 percent blended polyethylene.

Merion Bluegrass in 800 ml pots was grown in the greenhouse and fertilized with the product of Example 3, the sulfur coated granules of Example 3 without the resin coating, and with a sulfur coated urea coated with an additional 2 percent polyethylene by the conventional atmospheric pressure method.

The turf response to the fertilizer treatments were related by measurement of the weight of fresh grass cuttings. The controlled releases of the fertilizers were determined by the measurement of grass growth, after much of the initial soluble nutrients were spent, in the period between days 60 and 130 of the tests. The results are tabulated in the following table.

| Product | Granule Composition, Wt % | | | Leaf Weights grams (days 60–130) |
| --- | --- | --- | --- | --- |
|  | N | S | Resin |  |
| Example 3, no resin | 37.9 | 17.3 | 0 | 0.48 |
| Example 3 | 37.1 | 16.9 | 2.1 | 3.83 |
| Conventional Coated | 37.0 | 17.0 | 2.2 | 2.04 |

I claim:

1. A method of coating plant nutrient particles, exhibiting porous surfaces, with tenacious resin to form attrition resistant particulate fertilizers, comprising:
    (a) placing plant nutrient particles, which exhibit porous surfaces, in a coating vessel equipped for operation at pressures less than one atmosphere;
    (b) reducing pressure in the coating vessel and the plant nutrient particles to less than one atmosphere;
    (c) applying water insoluble fluid resin, at about one atmosphere pressure, to the surfaces of the plant nutrient particles so that the fluid resin is forced into the porous surfaces of the particles by a difference in pressure between the porous surfaces of the particles and the fluid resin; and,
    (d) converting the fluid resin to solid tenacious resin bonded into the porous surfaces of the plant nutrient particles by curing the resin.

2. The method of claim 1 wherein the plant nutrient particles exhibiting porous surfaces comprise particulate water soluble fertilizer materials selected from the group consisting of urea, ammonium sulfate, ammonium phosphate, potassium chloride, potassium nitrate, and potassium sulfate.

3. The method of claim 1 wherein the plant nutrient particles exhibiting porous surfaces comprise particulate slow releasing fertilizer materials selected from the group consisting of ureaform, magnesium ammonium phosphate, magnesium potassium phosphate, isobutylidene diurea, oxamide, granulated poultry waste, and aminoureaformaldehyde polymers.

4. The method claim 1 wherein the plant nutrient particles exhibiting porous surfaces comprise water soluble fertilizer particles coated, to slow nutrient release, with water insoluble inorganic materials selected from the group consisting of sulfur, magnesium ammonium phosphate, magnesium potassium phosphate, calcium phosphate, magnesium phosphate, and zinc phosphate.

5. The method of claim 1 wherein the plant nutrient particles exhibiting porous surfaces comprise fertilizer particles agglomerated into shapes selected from the group consisting of briquettes, granules, pieces of compacted particles, tablets, extrusions, pellets, and prills.

6. The method of claim 1 wherein the plant nutrient particles exhibit porous areas amounting to more than 10 percent of the total surface of the particle.

7. The method of claim 1 wherein the coating vessel, equipped for operation at pressures less than one atmosphere comprises a closed tank which rotates around its horizontal axis, causing plant nutrient particles contained therein to roll and thereby expose the porous surfaces of the particles for coating.

8. The method of claim 1 wherein the pressure in the coating vessel and the plant nutrient particles therein is reduced to between 0.06 and 0.40 atmospheres for a period of time exceeding 30 seconds.

9. The method of claim 1 wherein the water insoluble fluid resin is selected form the group of aqueous dispersions consisting of polyurethanes, polyolefins, polyacrylate-butadiene-styrenes, polyalkyds, polyesters, polyamides, and isocyanate-alkanolamine polymer.

10. The method of claim 1 wherein the water insoluble fluid resin applied to the porous surfaces of the plant nutrient particles amounts to between 0.5 and 20 percent of the attrition resistant particulate fertilizer on a dry basis.

11. The method of claim 1 wherein the water insoluble fluid resin is applied to the porous surfaces of the plant nutrient particles as a plurality of coating layers.

12. The method of claim 1 wherein the water insoluble fluid resin is molten resin selected from the group consisting of polyurethanes, polyolefins, polyacrylate-butadiene-styrenes, polyalkyds, polyesters, polyamides and isocyanate-alkanolamine polymers.

13. The method of claim 1 wherein the water insoluble fluid resin is applied to the porous surfaces of the plant nutrient particles by spraying at a pressure of between 0.7 and 3.5 atmospheres.

14. The method of claim 1 wherein the water insoluble fluid resin is applied to the porous surfaces of the plant nutrient particles by pouring the resin onto the particles and spreading thereover by rolling and rubbing actions of the particles in the coating vessel.

15. The method of claim 1 wherein the resin hardening means for converting the fluid resin to solid tenacious resin coating is heating to a temperature above the boiling point of water.

16. Attrition resistant particulate fertilizers exhibiting tenacious resin coatings penetrating into porous surfaces of the fertilizer particles prepared by the method of claim 1.

17. A method of preparing attrition resistant controlled release fertilizers consisting of granules exhibiting porous surfaces, coated with tenacious resins, comprising:

(a) charging fertilizer particles which exhibit porous surfaces amounting to more than 15 percent of the total surface of the particles, into a coating vessel comprising a tank rotating around its horizontal center axis, causing the contained fertilizer granules to roll and thereby expose the surfaces of the fertilizer granules for coating;

(b) reducing the pressure, by means of a vacuum producing device, in the coating vessel and the porous surfaces of the fertilizer granules therein to between 0.06 and 0.40 atmospheres for a period of time between 30 and 300 seconds;

(c) maintaining the reduced pressure at between 0.06 and 0.40 atmospheres and applying water insoluble fluid resin, comprising an aqueous resin dispersion containing between 15 and 40 percent resin, at about 1 atmosphere pressure, to the surfaces of the fertilizer granules so that the fluid resin, amounting to between 2 and 15 percent of the fertilizer granules, is forced into the porous surfaces of the fertilizer granules by difference in pressure between the porous surfaces and the fluid resin;

(d) converting the fluid resin to solid tenacious resin bonded onto, and into, the surfaces of the fertilizer granules, to form attrition resistant controlled release granular fertilizers by heating to a temperature between 60 and 120° C. to dehydrate the aqueous resin dispersion.

18. Attrition resistant controlled release fertilizer granular composition containing fertilizer granules exhibiting porous surfaces coated with tenacious resins penetrating into the interstices between agglomerated particles which form the granules, prepared by the method of claim 17.

19. A four step method of preparing attrition resistant slow release fertilizers from particulate sulfur coated fertilizers, comprising:

(a) charging particulate fertilizers, coated with between 8 and 25 percent sulfur, and exhibiting particle diameters between 0.5 and 4.5 millimeters and porous surfaces amounting to more than 15 percent of the total surface of the particulate fertilizers, at a temperature between 75 and 100° C., into a coating vessel comprising a tank rotating around its center horizontal axis, causing the particulate fertilizers to roll and thereby expose the surfaces of the fertilizer particles for coating;

(b) reducing pressure in the coating vessel and the porous surfaces of the particulate sulfur coated fertilizers to a pressure of between 0.06 and 0.40 atmosphere for a period of time between 30 and 300 seconds;

(c) maintaining the pressure at between 0.06 and 0.40 atmospheres and applying at a temperature of between 75 and 130° C., at a pressure of about 1 atmosphere, a molten water insoluble resin selected form the group consisting of polyolefins, ethylene vinyl acetate copolymer, polyurethane, grafted polyamide-polypropylene, and polyepoxy, to the porous surfaces of the particulate fertilizers coated with sulfur, so that the molten resin is forced into, and onto, the porous surfaces by differences in pressure between the porous surfaces and the molten resin, the molten resin applied amounting to between 0.5 and 5.0 percent of the attrition resistant slow release fertilizers; and, (d) cooling the attrition resistant slow release fertilizers to a temperature less than 50° C.

20. The method of claim 19 wherein the molten water insoluble resin is a natural, or synthetic, resinoid which has the property of curing to a hard resin when heated.

21. A method of coating porous surfaces of fertilizer particles with tenacious pesticide-resin solids to form attrition resistant fertilizer-pesticide combination particles comprising:

(a) charging fertilizer particles exhibiting porous surfaces amounting to more than 15 percent of the total surface of the particles, into a coating vessel comprising a tank rotating around its horizontal center axis causing the contained fertilizer particles to roll, and thereby, expose the surfaces of the fertilizer particles for coating;

(b) reducing pressure in the coating vessel and the porous surfaces of the fertilizer particles by means of a vacuum pump to a pressure between 0.06 and 0.75 atmosphere for a period of time between 30 and 600 seconds;

(c) maintaining the reduced pressure at between 0.06 and 0.75 atmosphere and applying a pesticide dispersed in a resinoid, containing between 5 and 60 percent pesticide, at about one atmosphere pressure, to the surfaces of the fertilizer particles so that pesticide dispersed in the resinoid is forced into, and onto, the porous surfaces of the fertilizer particles by differences in pressure between the porous surfaces and the pesticide dispersed in the resinoid; and, (d) converting the pesticide dispersed in the resinoid to a tenacious pesticide-resin solid bonded onto, and into, the porous surfaces of the fertilizer particles, forming attrition resistant fertilizer-pesticide combination particles, by heating at a temperature between 60 and 130° C. until the resinoid cures and forms a hardened resin providing attrition resistance for the pesticide.

22. The method of claim 21 wherein the pesticide is selected from the group consisting of insecticides, fungicides, acaricides, and herbicides.

23. The method of claim 21 wherein the pesticide is selected from the Group consisting of N-(1-ethylpropyl)-3, 4-Dimethyl-2,6-dinitrobenzenamine, 0,0-diethyl-0-(3,5,6-trichloro-2-pyridinyl)phosphorothionate, 1-[(6-chloro-3-pyridinyl)methyl]-N-nitro-2-imidazolidinimine, aluminum tris (0-ethyl phosphonate), N-[(2,6-dimethylphenyl)-N-(methyloxyacetyl) alanine methyl ester and 1-(4-chlorophenoxy)-3,3-dimethyl-1-(1H-1,2,4-triazol-1-yl)-2-butanone.

24. An attrition resistant particulate combination fertilizer-pesticide composition which retains between 0.01 and 10.00 percent pesticide during handling and application, prepared by the method of claim 21.

* * * * *